(12) United States Patent
Marcucci

(10) Patent No.: US 10,807,435 B1
(45) Date of Patent: Oct. 20, 2020

(54) CAR COOLING DEVICE, SYSTEM AND METHOD OF USE

(71) Applicant: Lisa Marcucci, Mechanicsburg, PA (US)

(72) Inventor: Lisa Marcucci, Mechanicsburg, PA (US)

( * ) Notice: Subject to any disclaimer, the term of this patent is extended or adjusted under 35 U.S.C. 154(b) by 0 days.

(21) Appl. No.: 16/687,247

(22) Filed: Nov. 18, 2019

Related U.S. Application Data

(60) Provisional application No. 62/884,751, filed on Aug. 9, 2019.

(51) Int. Cl.
*B60H 1/00* (2006.01)
*B60H 1/24* (2006.01)
*B60H 1/32* (2006.01)

(52) U.S. Cl.
CPC ......... *B60H 1/00064* (2013.01); *B60H 1/242* (2013.01); *B60H 2001/3286* (2013.01)

(58) Field of Classification Search
CPC B60H 1/0025; B60H 1/00295; B60H 1/3204; B60H 2001/003; B60H 1/00064; B60H 1/242; B60H 2001/3286
USPC ............................................ 454/69, 116, 370
See application file for complete search history.

(56) References Cited

U.S. PATENT DOCUMENTS

| | | | | |
|---|---|---|---|---|
| 3,383,778 A | * | 5/1968 | Goodman | A45D 20/18 34/90 |
| 4,993,314 A | * | 2/1991 | Braden | B63G 13/02 110/184 |
| 5,099,752 A | * | 3/1992 | Bosley | B60H 1/00257 454/131 |
| 5,562,155 A | * | 10/1996 | Blumberg | B65D 88/74 165/128 |
| 5,636,993 A | | 6/1997 | Badry | |
| 6,623,353 B1 | | 9/2003 | Akhtar | |
| 8,016,651 B2 | | 9/2011 | Mangiapane | |
| 2017/0316133 A1 | | 11/2017 | Abramov | |
| 2018/0266395 A1 | | 9/2018 | Abramov | |

FOREIGN PATENT DOCUMENTS

| | | |
|---|---|---|
| CN | 102975590 A | 3/2013 |
| CN | 202834018 U | 3/2013 |

\* cited by examiner

*Primary Examiner* — Edelmira Bosques
*Assistant Examiner* — Dana K Tighe
(74) *Attorney, Agent, or Firm* — William Gray Mitchell

(57) ABSTRACT

The invention is a device, system and method of use for cooling the temperature in the passenger compartment of a vehicle without the need for a power source or moving parts, thus allowing the device to operate when the vehicle engine is turned off.

11 Claims, 2 Drawing Sheets

CAR COOLING DEVICE, SYSTEM AND METHOD OF USE

CROSS REFERENCE TO RELATED APPLICATIONS

This application claims priority to U.S. provisional patent application 62/884,751, filed on Aug. 9, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a device and system for cooling the interior temperature of a vehicle without requiring a power source or moving parts, as well as a method of using such device.

Background of the Invention

Air conditioning and interior temperature cooling for passenger vehicles have been known for decades. In particular, the use of auto air conditioners requiring electric compressors, fans and the use of freon or similar coolant began to be offered as options in passenger car sales in the mid-twentieth century and such systems continue to this day.

Aside from lowering the gas mileage and available engine power in a running automobile, current auto air conditioning also fails to provide any cooling to the passenger compartment of a vehicle once the engine is turned off.

Known devices for cooling passenger compartments with the engine off typically rely upon powered exhaust fans removing heated interior air through cracked vehicle windows. Such fans rely upon a power source, be it battery-operated, solar or otherwise.

What is needed is an affordable, non-powered type of cooling device for use inside the passenger compartment of a vehicle. Such a device would comprise few or no moving parts and no requirements for electrical or other outside power, and thus be capable of operating regardless of whether the vehicle engine is on. Such a device is described herein below, along with a method of use.

BRIEF SUMMARY OF THE INVENTION

In a preferred embodiment, A cooling device, wherein such device is funnel-shaped, comprising a small opening and a large opening, wherein the large opening faces downward and the small opening faces upward, wherein each funnel unit is adhered to a horizontal surface.

In another preferred embodiment, the cooling device as described herein, wherein the funnel unit is seated on a horizontal surface and further comprises one or more interspaced spacers and air openings arranged on an edge of the large opening to allow for air intake into such funnel unit.

In another preferred embodiment, the cooling device as described herein, wherein each spacer is approximately ⅝" in depth.

In another preferred embodiment, the cooling device as described herein, wherein each funnel unit is adhered to a base unit at the large opening, and each base unit is adhered to a horizontal surface within a vehicle interior.

In another preferred embodiment, the cooling device as described herein, wherein the base unit is comprised of a flexible latticework or similar flexible material, wherein such latticework also comprises a plurality of high heat capacitance units.

The cooling device of claim 1, further comprising a plurality of high heat capacitance units attached to the inside face of the large opening.

In another preferred embodiment, a cooling device, wherein such device is bottle-shaped, comprising a small opening and a large opening, wherein the large opening faces downward and the small opening faces upward, wherein a plurality of high heat capacitance units is attached to the inside face of the large opening and each funnel unit is adhered to a vertical surface.

In another preferred embodiment, the cooling device as described herein, wherein each funnel unit is covered in dark material.

In another preferred embodiment, the cooling device as described herein, wherein each funnel unit comprises adhesive on an exterior side wall for attachment to a vertical surface within a vehicle interior.

In another preferred embodiment, a cooling system comprising one or more funnel units, each either funnel-shaped or bottle-shaped and each comprising a small opening and a large opening, wherein the large opening faces downward and the small opening faces upward, wherein a plurality of high heat capacitance units is attached to the inside face of the large opening and each funnel unit, wherein each of the one or more funnel units are adhered to a horizontal surface or a vertical surface within the interior of a vehicle.

In another preferred embodiment, the cooling system as described herein, further comprising one or more neoprene sleeves, wherein three to seven funnel units are inserted into each such sleeve and each sleeve comprises holes correlating to the diameters of each funnel unit's small opening and large opening.

In another preferred embodiment, a method of cooling a vehicle interior using the cooling system of claim 10, wherein the one or more funnel-shaped funnel units are each adhered to a horizontal surface in the interior of a vehicle and the one or more bottle-shaped funnel units are each adhered to a vertical surface within the interior of a vehicle, and each such funnel unit continuously draws hot vehicle interior air through the large opening, cools such air inside the funnel unit, then exhales cooled air through the small opening.

DETAILED DESCRIPTION OF THE INVENTION

Figure 1:
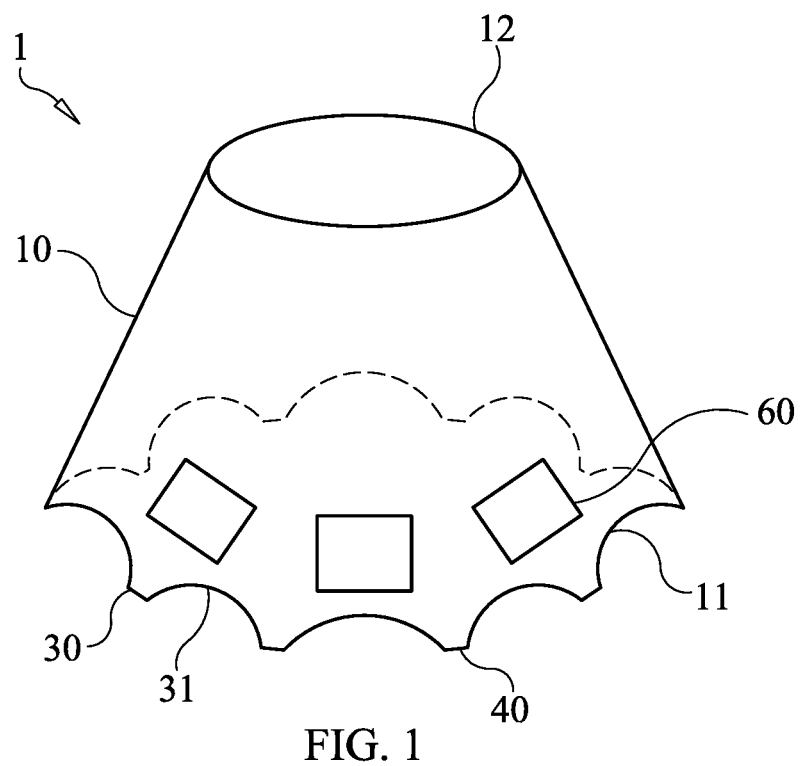
FIG. 1 is a line drawing evidencing a non-powered cooling device for a vehicle interior comprising a funnel unit.

The invention constitutes a system made up of one or more individual funnel-shaped cooling units of varying sizes that can be placed on both horizontal and vertical surfaces of a vehicle interior, with large openings facing down and small openings facing up. The larger system works best when individual units are positioned in areas of the vehicle cabin that are known to warm rapidly under radiant heat. In a preferred embodiment, each such funnel unit will be placed using a semi-permanent adhesive allowing it to be removed or relocated at will. In an alternate embodiment, the funnel unit comprises a bottle shape, with a larger barrel aspect for the large opening and a bottle neck element for the small opening.

The large opening of each unit will comprise a series of interspersed spacers and air openings, such that the funnel unit will immediately trap the warm air below as it rises. According to the Venturi effect, a known volume of air traversing through a progressively smaller cross-sectional area must undergo compression and an increased flow rate. According to Bernoulli's principle, an increase in the flow rate of a fluid (e.g., air) must be accompanied by a decrease in the fluid's potential energy, which results in decreased temperature. Thus, the air passing through the funnel unit will be compressed and have its flow rate increased, such that the air exiting the unit through its upper small opening will be cooler than the air entering the lower large opening. In an alternate embodiment, the larger opening may be an unbroken rim with air intake holes cut or drilled above such rim.

Depending on the thermodynamics of the adjacent environment, the air intaken and cooled will either descend or keep rising, albeit at a slower rate. Regardless of which direction the just cooled air moves, a micro convection current will occur in the adjacent area, which will cause additional cooling. This flow pattern is continuous while the device is in place and pulls more outside air into the large opening, thus working on a positive feedback basis to constantly draw air from the vehicle interior into the device.

To enhance the volume of warm air entering the large opening, one or more high heat capacitance units will be arranged on the interior surface of a funnel unit at or near the large opening, which material will act as a capacitor in a standard air conditioner, without requiring a dedicated power source. This high heat capacitance material will assist in creating a heat sink and additional convection air currents to draw hot air into the funnel, thus further increasing the cooling efficiency of the unit.

To lessen reflection on the car windows after the units are placed in the desired position, the funnels and bottle necks are sheathed in a dark cover circumferentially extending into each orifice, and then attached to the inside plastic wall. In a preferred embodiment, a bottle-shaped funnel unit is surrounded by packing material such as foam, synthetic fiber, natural fiber, etc. and then sheathed in a spongy material such as neoprene, which is sewn closed to form a log-like structure. For the back of the front seats, each log will contain a plurality of such bottle-shaped funnel units, preferably five, positioned horizontally. Other such units may be placed two and three across and will have smaller openings In practice, each user will be able to mix and match funnel units according to given vehicle interior configuration, positioning the units for best cooling effect. In an alternate embodiment, a funnel unit may be totally coated in neoprene, inside and out, with the neoprene itself acting as a high heat capacitance material.

Some dark covered funnel units will be sewn in a diagonal pattern such that the openings are still parallel to the car ceiling and floor. Each such covered unit will have a cord with an adjustable feature that will allow it to be secured to a head rest or safety hand bar to prevent it from flying loose in the cabin in event that the adhesive fails. A cloth strip will be sewn into each dark cover to facilitate attaching the safety cord from either end. Semi-permanent clear adhesive, preferably with a peel off back, will be attached to each such covered funnel unit to allow for adhesion to a vertical surface. In one iteration, Velcro tape is used.

The funnel units to be seated on horizontal surfaces will be funnel-shaped and low profile so as not to obscure the driver's view when seated on a dashboard. Multiple units may be set into a flexible lattice that will allow it to be placed on the surface of the dashboard over the instrument panel and down each side. The openings in such lattice base will allow the funnel unit to intake air without the incorporation of air openings in the funnel itself. Ideally, the lattice base will comprise neoprene or similar heat-resistant covers, thereby protecting the funnel rim from the very hot dashboard or similar surface, while also decreasing the temperature of air entering the funnel. The funnels will also have multiple pieces of high heat capacitance material adhered to the inner wall. In a preferred embodiment, such funnel units for horizontal placement also will be covered in a dark cover, but will lack the packaging material and neoprene components of the vertical units.

Funnel units will preferably be made of plastic of a type from the group including, but not limited to, high-density polyethylene, low-density polyethylene, copolyester or polypropylene. Alternative materials may include, glass, ceramic, or metal. The large openings of the funnel will be approximately ⅛-½ of an inch, preferably ⅝ inches, off of the dash surface and will spaced far enough apart that the sun's rays predominantly hit the dashboard surface and not the device. Preferred diameters for the large opening will be in the range of 2 inches to 4 inches, and the small opening from ¼ inch to two inches, with a preferred range of ½ inch to 1 inch, although larger or smaller iterations are possible. The preferred ratio of large opening to small opening is approximately 3:1.

The latticework base will be black in color, and preferably neoprene-covered, and will be supported by rigid vertical struts so that placing an object on the structure will not deform or crush it. In one embodiment, either the base unit is made of a high heat capacitance material such as wood or hemp, or high heat capacitance units will be arranged within the latticework of the base structure as well as within the funnel units themselves. Flexible strut connectors will be used to allow the base to overlay an irregular surface, such as the dashboard of a vehicle over the instrument panel. Additional flexible connectors will connect the upper portion of each strut to one or two funnel units interspersed between the pairs of struts, such that the funnel units will hang over the dashboard without touching it, thereby preventing the funnels from heating and related deformation. Rigid vertical struts may be comprised of wood, metal, or any other material suitable for appropriate weight bearing. Flexible connectors may be comprised of hemp or other flexible organic material, rubber, plastic, neoprene or other fabric, or any other material with appropriate heat resistance and flexibility. Connectors running between a given pair of vertical struts along the dashboard may preferably be rigid as well, to assist in maintaining verticality of the struts.

On both the funnel-shaped and bottle-shaped units, the smaller opening will be rigid and non-compressible to ensure unimpeded air flow through the unit. In one embodiment, funnel units can be manufactured using recycled plastic water bottles that require no modification other than cutting them to size. To create the heat sink, balsa wood is a highly preferred material, because of low cost, low weight, ease of cutting and for its high heat capacitance properties. Alternative materials include but are not limited to glass, hemp or other organic material, alternate types of wood, ceramic, plastic film, paper and mica.

Once the units are positioned, the system will work 24 hours a day without moving parts or an outside energy source. The more units placed in the car, the better the cooling capacity of the system. The units themselves require no customization and can be installed in a few minutes by just peeling off the adhesive, pressing them onto the cabin interior, and fastening the safety cord and tightening it. It should be noted that, while the cooling power of the disclosed device may be most noticeable after a period with the engine off, the system will still work even while the vehicle is operating, reducing the work required of the vehicle's air conditioner and the fuel required to operate such system.

EXAMPLE

During a 95 F sunny day (heat index 110) a Volvo SUV with dark upholstery was left for six hours with the doors and windows closed in the sun, after which the interior temperature exceeded 170 degrees. Next, 30 bottle-shaped cooling units were attached to interior vertical surfaces and 8 funnel-shaped units were attached to the front dashboard. With the cooling system in place, and without the introduction of any power, the car's inside temperature after 6 hours registered about 120 degrees. The cooling capacity will increase with the number of units placed around the car. Extrapolating from the number of units used to establish a 50 degree temperature drop, it would be possible to maintain an interior temperature within 20 degrees F. of the outside air temperature in temperate zones.

It should be noted that any of the iterations disclosed herein may be reversed to accomplish a warming effect within a passenger compartment.

DETAILED DESCRIPTION OF THE FIGURES

FIG. 1 shows a first embodiment of a non-powered cooling device 1 for a vehicle interior comprising a funnel unit 10 with a large opening 11 and a small opening 12. The pictured embodiment shows the cooling device in a low-profile configuration for use on a horizontal surface, such as a dashboard. In FIG. 1, the large opening is facing downward and further comprises a series of spacers 30 interspaced with air openings 32, creating an air inflow mechanism, with the air thereafter passing through the funnel unit 10 and out of the small opening 12, with the air being compressed and cooled during such progression. This air movement results in the creation of micro convection current and heat sink within the funnel unit 10, resulting in additional drawing of air into the air openings 31. This process is further enhanced by the placement of high heat capacitance units 60, in this figure pictured as rectangular blocks, adhered to the inner wall 15 of the funnel unit 10 to act on the air as it passes.

The ends of one or more spacers 30 will also comprise an adhesive layer 40 which will serve to attach the cooling device, either directly to the horizontal surface within a vehicle or to a base (not pictured), which base can then be attached to such surface.

Figure 2:
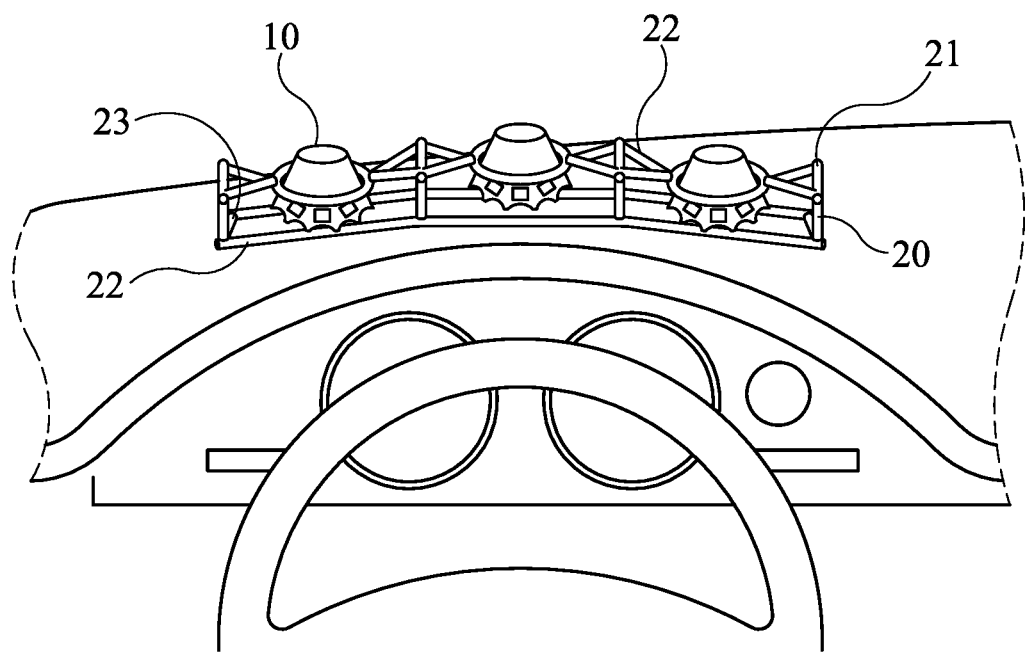
FIG. 2 is a line drawing evidencing an alternate embodiment of the device of FIG. 1, wherein a plurality of bottle-shaped funnel units are attached to a single base.

FIG. 2 shows an alternate embodiment of the device of FIG. 1, wherein a plurality of funnel units are attached to a single latticework base 20 along the top of a vehicle dashboard. The base 20 comprises a plurality of pairs of base struts 21 raised vertically from an auto dashboard, each such pair of struts connected by a rigid base connector 23. Each pair of struts 21 is connected to one another by two or more of flexible base connectors 23 overlaying the dashboard, and each set of struts is further interspersed with and connected to funnel units 10 by a plurality of flexible base-funnel connectors 24, wherein such flexible base-funnel connectors adhered or tied to the top of each strut and around each funnel unit. Thus, each funnel unit is allowed to hang freely above the dashboard without touching it.

Figure 3:
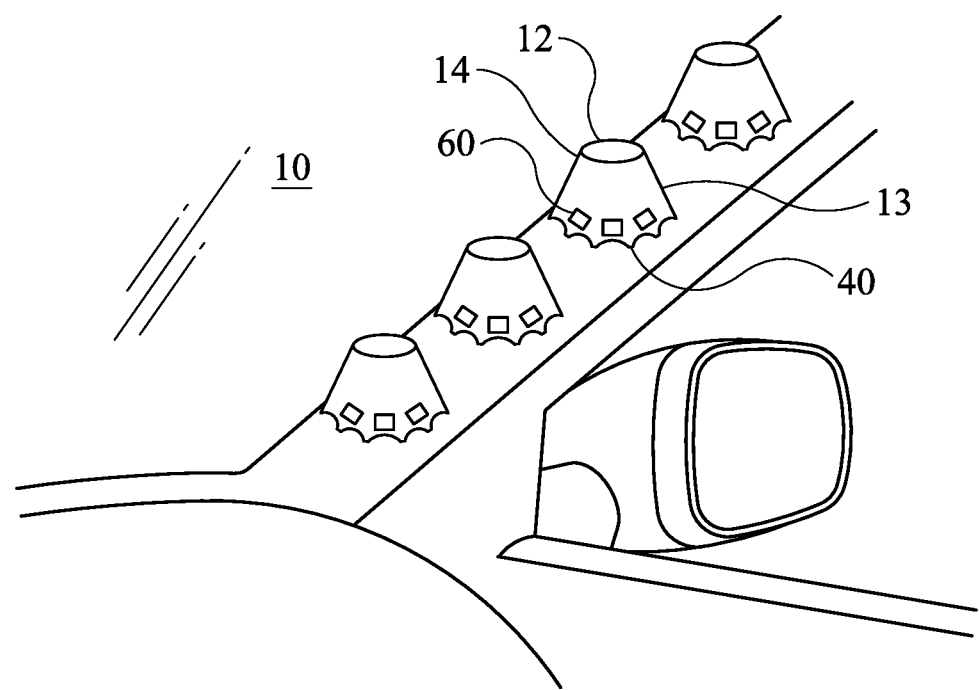
FIG. 3 is a line drawing evidencing an alternate embodiment of the device of FIG. 1, wherein a plurality of funnel units are bottle-shaped and each attached to a vertical or nearly vertical surface.

FIG. 3 shows a second embodiment of cooling device 1, this time configured for use on a vertical surface within a vehicle interior. Unlike the horizontal unit of FIG. 1, spacers and air openings are unnecessary in this iteration since the large opening 12 is not overlaying a flat surface. In this embodiment, the funnel unit 10 appears as a bottle shape with a neck 14 enclosing the small opening 12 and a barrel 13 enclosing the large opening 11. As with the horizontal unit, the small opening 12 is pointed upward, and a plurality of high heat capacitance units 60 are adhered along the inner wall 15 of the funnel unit 10. An adhesive strip 40 is used to attach each funnel unit to a vertical surface of the car interior, pictured in this figure as the strut adjacent to a car door.

Figure 4:
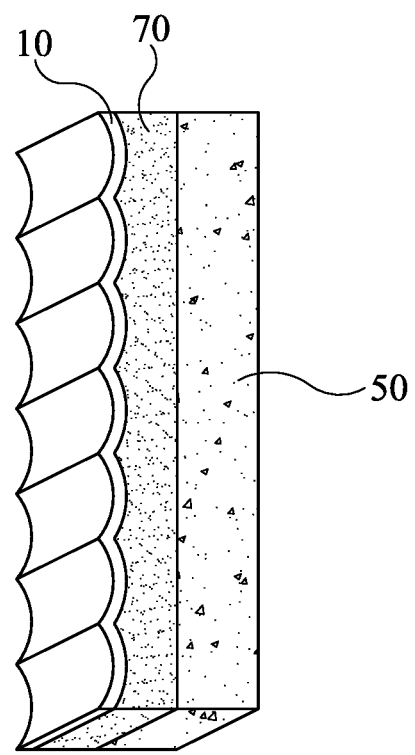
FIG. 4 is a line drawing evidencing a cutaway view of the funnel unit as pictured in FIG. 3, such unit sheathed in a dark cover.

FIG. 4 shows a cutaway view of the cooling device embodiment of FIG. 3, wherein the bottle-shaped funnel unit 10 is overlaid with a layer of packing material 70, and further overlaid by a dark cover 50, preferably of neoprene material.

LIST OF REFERENCE NUMBERS

1 Cooling device
10 Funnel unit
11 Large opening
12 Small opening
13 Barrel
14 Neck
15 Inner wall
20 Base
21 Base strut
22 Flexible base connector
23 Rigid base connector
30 Spacer
31 Air opening
40 Adhesive
50 Dark cover
51 Cord loop
52 Cord
60 High heat capacitance units
70 Packing material The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A cooling device, comprising a funnel-shaped funnel unit, the funnel unit comprising a small opening and a large opening, wherein the large opening faces downward and the small opening faces upward, wherein the funnel unit is adhered to a horizontal surface, further comprising a plurality of high heat capacitance units attached to an inside face of the large opening.

2. The cooling device of claim 1, wherein the funnel unit is seated on the horizontal surface and the funnel unit further comprises one or more interspaced spacers and air openings arranged on an edge of the large opening to allow for air into the funnel unit.

3. The cooling device of claim 2, wherein the one or more interspersed spacers are approximately ⅝" in depth.

4. The cooling device of claim 2, wherein the funnel unit is adhered to a base unit at the large opening, and the base unit is adhered to the horizontal surface within a vehicle interior.

5. The cooling device of claim 2, wherein the base unit is comprised of a flexible latticework or similar flexible material, wherein the latticework or the similar flexible material also comprises a plurality of high heat capacitance units.

6. The cooling device of claim 1, wherein the funnel unit is covered in dark material.

7. The cooling device of claim 1, wherein the funnel unit comprises adhesive on an exterior side wall for attachment to a vertical surface within a vehicle interior.

8. A cooling device, comprising a bottle-shaped funnel unit, the funnel unit comprising a small opening and a large opening, wherein the large opening faces downward and the small opening faces upward, wherein a plurality of high heat capacitance units are attached to an inside face of the large opening and the funnel unit is adhered to a vertical surface.

9. A cooling system comprising one or more funnel units, wherein each of the one or more funnel units is either funnel-shaped or bottle-shaped and each of the one or more funnel units comprises a small opening and a large opening, wherein the large opening faces downward and the small opening faces upward, wherein a plurality of high heat capacitance units are attached to an inside face of the large opening of each of the one or more funnel units, wherein each of the one or more funnel units are adhered to a horizontal surface or a vertical surface within an interior of a vehicle.

10. The cooling system of claim 9, further comprising one or more neoprene sleeves, wherein three to seven funnel units are inserted into each of the one or more sleeves and each of the one or more sleeves comprises holes correlating to the diameters of the small opening and the large opening of each the funnel units.

11. A method of cooling a vehicle interior using the cooling system of claim 9, wherein the one or more funnel-shaped funnel units are each adhered to the horizontal surface in the interior of the vehicle and the one or more bottle-shaped funnel units are each adhered to the vertical surface within the interior of the vehicle, the method comprising drawing hot vehicle interior air through the one or more large openings, cooling the hot vehicle air inside the one or more funnel units, and exhausting cooled air through the one or more small openings.

* * * * *